United States Patent Office 2,835,552
Patented May 20, 1958

2,835,552

SOLVENT EXTRACTION PROCESS FOR THE RECOVERY OF URANIUM VALUES FROM AQUEOUS SOLUTIONS

William J. McGinnis, Lakeland, Fla., assignor, by mesne assignments, to the United States of America as represented by the United States Atomic Energy Commission No Drawing. Application December 8, 1952
Serial No. 324,829

14 Claims. (Cl. 23—14.5)

This process relates to the recovery of certain mineral values from phosphate ores such as the leached zone layer and the phosphate matrix layer found in the Florida pebble phosphate fields and other uranium ores. The leached zone layer lies intermediately to the top sands cover and the phosphate matrix. The leached zone layer averages 6 to 11 feet in depth and may be found with a transition zone between it and the phosphate matrix comprising a mixture of materials from each of the matrixes. The phosphate matrix found below the leached zone averages 10 to 20 feet in depth. Strip mining removes the sandy top cover. This uncovers the leached zone, or so-called Bartow clay, which is less phosphatic than the phosphate matrix. Both layers contain materials in which there occur minor element values, and uranium values ranging from 0.007% to about 0.3%.

Apparently uranium occurs in different forms in the different layers. The leached zone layer contains predominately acid insoluble quartz which it has been found advantageous to remove, but not necessary to the invention, before acid solubilizing. The uranium values occur, when a split is effected in leached zone material predominately in the small particle fraction of a size smaller than about 150 mesh to about 220 mesh. This small particle fraction is the more valuable fraction of the leached zone material for the purpose of the instant invention and contains roughly 70% of the valuable minerals to be found in the leached zone material.

On the other hand, it has been found advantageous to separate the phosphate matrix after clay and slime removal into two fractions; a coarse fraction of approximately +200 mesh and a fine fraction of −200 mesh inasmuch as in this material approximately 80% of the valuable minerals and uranium occur in the +200 mesh fraction.

Once a source material has been prepared and the respective solutions obtained the method of recovering the uranium and other mineral values therefrom is the same as regards the major processing steps.

In the process discussed herein, relative to processing phosphates as a representative ore, a slurry from the ore dressing operation of leached zone material is thickened to about 20 to 40% solids density. This slurry is reacted or digested with an acid such as sulfuric under such conditions of time, temperature, pressure, concentration of acid and total amount of acid as to obtain optimum recovery of uranium, phosphatic and aluminum values, i. e., through the formation of compounds soluble in aqueous media. Under some circumstances, depending primarily upon the solids composition, it is preferable that the solids be reacted with sulfuric acid in combination with an oxidizing agent, such as nitric acid. The solubilizing agent, it will be recognized, may be other than sulfuric acid.

Minerals and phosphates to be found in the ore either with or without any sizing treatment are converted into water soluble products by reaction with sulfuric acid under conditions which give either a slurry product or a dry product. The slurry products may be formed as a result of the so-called wet process method or the pressure method.

In the wet process method, the reaction is carried out at a temperature generally between 60° and 90° C. and preferably at about 75° C. Digestion is carried out in a slurry condition for a period of 10 to about 360 minutes and preferably under conditions for maximum recovery of mineral values during a reaction period of 15 minutes to 60 minutes. Generally, shortening of the reaction time is accomplished by increasing the degree of acidulation. Concentration of acid contained in the slurry mixture should be between 20% and 50% sulfuric acid, preferably about 30%. The acid may be added as 98% sulfuric acid or as dilute acid of a strength such that upon addition to the aqueous slurry, the desired final acid concentration in the mixture is attained. Depending upon the character of the particular material being processed, between about 20% and 105% acidulation is desired. Normally this corresponds to the addition of between about 29 pounds and about 120 pounds of sulfuric acid per 100 pounds of sized ore.

The percent acidulation referred to in this description is calculated on the basis of the reaction of sulfuric acid with the significant cationic constituents present, i. e., iron, aluminum, magnesium, sodium and calcium, the acidulation being called 100% acidulation when the sulfuric acid content in addition is sufficient to convert all of the tricalcium phosphate present to monocalcium phosphate.

In the pressure autoclave method of treating slurry, which is usually utilized in the treatment of leached zone material, 20% to 65% solids content slurry of about +200 mesh is heated under either extraneously produced or autogenous pressure. Pressures ranging between 10 pounds per square inch gauge and about 175# per square inch gauge or above are useable but it is preferred to maintain pressures of about 160# gauge. Temperatures maintained in the reaction mass are normally between about 75° C. and about 200° C. The concentration of the sulfuric acid in the slurried mixture is about the same for either the wet process or pressure method.

The time of digestion in the autoclave process is much shorter than for the wet process and requires between about 1 minute and about 60 minutes, preferably 30 to 45 minutes. For maximum recovery of uranium and aluminum values, the percent acidulation ranges between about 20% and about 90% with about 80% acidulation preferred. At 80% acidulation between about 85 and about 93% of the $U_3O_8$ and 80–93% of the alumina and 85% to 95% of the phosphate content is solubilized.

In the aging method, the mixture of ore and acid is balanced to produce after thorough agitation a soupy mass. The mixing time is usually 2 to 5 minutes. The soupy mixture resulting from the acid addition is delivered to a curing pile where it sets to a dry mass while it remains for between about 15 and 60 days, preferably about 45 days although the exact time is not critical. In general, the longer the curing period, the higher the ultimate recovery of the desired constituents will be.

The concentration of acid employed is usually the highest possible concentration compatible with the type of equipment used and with the ability to mechanically agitate the soupy mass during the acid addition step. The sulfuric acid is usually added as 40 to 65% aqueous sulfuric acid. The greater the percent of acidulation, the greater the ultimate recovery of desired constituents will be. Acidulation will vary from about 25% to about 85% and preferably will be about 65%.

The digested material when mixed with water or aqueous medium forms a slurry. The extract produced from various sources of raw materials after removal of the insoluble constituents will vary, depending upon the degree of acidulation, from an acid solution either predominately sulfuric acid or substantially phosphoric acid to a solution, that is predominately monocalcium phosphate. The taking up in the aqueous medium of the soluble constituents is generally done in a step-wise multi-stage (usually three or four) countercurrent leaching operations.

The extract of dissolved material containing the uranium, phosphorus and aluminum values or other values may be treated to recover uranium solely either from slurry or solids-free extract but is preferably step-wise treated for separate recovery of each of these values.

Generally, in treating the extract from leached zone material as a representative solution the aluminum is separated first. To accomplish this the filtrate from the solids-liquid separation preferably is treated with a sulfate of ammonia, i. e. ammonium sulfate or ammonium acid sulfate. The filtrate is preferably adjusted to a specific gravity between about 1.25 and 1.5 before sulfate addition, generally to about 1.3. Maximum yield of ammonium alum crystals is obtained by proper correlation of time and temperature and ratio of $Al_2O_3$ to $SO_4$. Crystallizing time may be as long as 24 hours but for economic commercial operation 2 to 4 hours is satisfactory.

Solution of ammonium sulfate is usually carried out at about 70° C. To crystallize out the alum, the mixture is generally cooled to between + 25° C. and −10° C. with about + 5° C. being normally used. For optimum aluminum recovery, it has been found that the quantity of sulfate should approach an $Al_2O_3$ to $SO_4$ mol ratio of about 1 to 4 or at least the sulfate should be in excess of that required to combine with the $Al_2O_3$ to give aluminum sulfate. This adjustment of $SO_4$ ratio is an item of consideration in determining the degree of acidulation with sulfuric acid. If acidulation is carried to 100%, the $Al_2O_3$ to $SO_4$ mol ratio in the solution from the leaching operation would be about 1 to 3. Lower acidulation with its consequently lower ratio, say $Al_2O_3$ to $SO_4$ mol ratio 1 to 2 from 60% acidulation, gives lower alum recovery. This can be compensated by addition of sulfuric acid and/or sulfates of ammonia just prior to ammonium alum crystallization. In commercial operations it is important that the ammonium content is not appreciably higher than necessary to give ammonium sulfate since with rise in alkalinity, the alum recovery will decrease for any given set of crystallizing conditions. Ammonium sulfate is normally added such that the $(NH_4)_2SO_4$ to $Al_2O_3$ mol ratio falls between 1 to 1 and 3:1 and preferably at about 1.8 to 1.

In order to assure alum crystals of as high purity as possible the liquor for alum crystallization is cooled from about 65° or 70° C. to about 35° C. at a very slow rate, for example over a period of about 4 to 12 hours. Continuous crystallization such as the Oslo-Krystat system or batch crystallizations may be used, the latter being chosen if crystal purity is of upmost importance.

To prepare alum crystals sufficiently low in $P_2O_5$, $Fe_2O_3$ and other undesirable constituents the crystallization is preferably carried out in two stages, thereby obtaining crystals which can be further reacted to form relative pure aluminum hydrate, $Al_2O_3 \cdot xH_2O$, the further processing of which forms no part of the instant invention. Any number of crystallizations may be utilized to obtain a higher purity alum crystal and it is not intended to limit the operation described to any specific number of crystallizations.

The liquor from the first alum crystallization-separation operation is the feed material from which the uranium, iron, phosphorus, etc. values are ultimately recovered.

The liquor is next subjected to uranium recovery by use of the liquid-liquid solvent extraction methods. Preferably the liquor is conditioned for solvent extraction by a reduction reaction either by electrolytic means or by chemical reaction such as by treatment with powdered metallic iron aluminum and the like, although such action is not necessary to successful extraction. Without reduction, a larger number of extraction stages are required to get the same percentage recovery.

The uranium recovery operation consists, for example of agitating the liquor-metallic iron slurry for several minutes. The iron content of the slurry may be varied from 0.1 gram to about 8 grams per gallon of liquor, preferably about 2 grams. The slurry is next subjected to liquid-solids separation to remove unreacted metal. This may be accomplished through the use of a filter, centrifuge, cyclone or other suitable separation device.

Reduced liquid is then brought into intimate contact with an organic solvent having an affinity for uranium values. This organic solvent is made up of two components, the extractant and the vehicle or extender. The extractant may be one or more of the ortho and/or pyrophosphoric acid esters of alkyl monohydric alcohols, usually esters of alcohols of 4 to 10 carbon atoms. Both the mono and the di-esters, as well as mixtures of the two are useful. The butyl, amyl, hexyl, heptyl, n-octyl, iso-octyl, esters are satisfactory but the preferred species are the mono and/or the di-esters of either octyl or hexyl alcohol with the phosphoric acids since they are less water soluble.

The extender or vehicle may be any one or more of the common organic solvents such as kerosene, benzene, naphthas, mineral spirits, carbon tetrachloride, toluene, xylene and the like. Extenders are limited only in that they must be miscible or partially miscible with the extractant used and substantially immiscible with the aqueous solution or liquor. Since the esters or extractants have a limited solubility in water, the aqueous medium before recycling to the system is normally scrubbed with a solvent such as kerosene or trichlorethylene to reduce the ester content which would be lost in subsequent processing.

The concentration of the extractant in the vehicle may vary widely, for example between about 0.2% and about 100% preferably between about 5% and about 10%. The volume ratios of aqueous solution to solvent may also vary within wide limits, for example between 1 to 1 and 40 to 1, and preferably between 5 to 1 and about 20 to 1. It is preferred to contact the organic solvent with the liquor or solution temperatures between about room temperature and about 60° C., preferably about 20° C.

After agitation of the two materials to effect intimate contact, the time varying with efficiency of agitation, the materials are allowed to separate whereby two distinct phases are formed, namely an aqueous phase and the organic phase rich in uranium values. Continuous extraction is usually carried out in commercial operation in a multistage counter-current extractor.

The organic phase is next stripped of its uranium content and the organic solvent returned to the extraction system. The method of stripping as heretofore described has had the serious disadvantage that the extraction power of the organic solvent was quickly dissipated and emulsion difficulties were encountered. This loss of extractability for uranium caused the organic phase to be discarded after about 3 to 7 passes through the extraction system.

In applicant's new method of treating the organic phase separated in the extraction system the organic phase is treated with a mixture of phosphoric acid and hydrofluoric acid, by means of which emulsion formation is avoided and the $U_3O_8$ present in the organic phase is precipitated as a fluoride. This precipitated material, together with the aqueous phase is separated from the lean organic phase. The precipitated material is recovered by filtering or centrifuging and then washed and dried. The phosphoric acid may be present due to being added to the aqueous hydrofluoric acid or may be present due to buildup in the system.

To effect this precipitation, the rich organic phase was intimately mixed with aqueous solution of acids, either batchwise with agitation or in a continuous washing system preferably running countercurrently. The ratio of organic solvent to aqueous acid solution may be varied from about 1:1 to about 40 to 1 on a volume basis.

Aqueous solutions containing about 15 to about 45% phosphoric acid are satisfactory for this operation, with best results obtained with a phosphoric acid content of about 20-30%. The hydrofluoric acid content of the aqueous solution will vary depending somewhat upon the $U_3O_8$ content of the rich organic solvent. In general, the hydrofluoric acid content will vary from about 10% to about 30% with about 15% to about 25% hydrofluoric acid on a weight basis preferred for commercial operations. For maximum precipitation between about 5 and about 10 molar excess of hydrofluoric acid over that required to produce $UF_4$ is preferred. When the organic solvent solution is high in uranium content, hydrofluoric acid in excess of the above specified quantities may be required.

The aqueous phase acid solution after adjustment of its hydrofluoric acid content is recycled to mixing with uranium-rich organic solvent phase. The lean organic phase (either with or without treatment to strip it of its hydrofluoric acid content) is reused for subsequent uranium extraction of the uranium containing solution. Hydrofluoric acid may be stripped from the organic solvent phase by scrubbing with 5% sulfuric acid.

Uranium fluoride precipitate may be treated to recover the hydrofluoric acid for reuse. In this operation the precipitate is mixed with dilute sulfuric acid of 3 to 10% concentration in about a 1 to 5 volume ratio of solids to acid, heated to volatilize the HF for absorption and reuse and the partially evaporated solution cooled to crystallize uranyl sulfate, after which the crystals are separated from the mother liquor, washed and dried.

The invention will be further understood from the following examples which are given by way of illustration and not with any intention of being limited to the specific conditions set forth.

Example 1

About 10 tons per hour of Florida phosphate rock was ground to a particle size approximately 62% of which passed through a 200 mesh standard screen. This ground rock analyzed about 67% bone phosphate of lime. The ground rock was mixed with about 6 tons per hour of about 98% sulfuric acid added as approximately 54° Baumé aqueous solution. The mixture was thoroughly agitated for about five minutes after which it was discharged onto a continuous belt provided with exhaust means for gases such as sulfur dioxide, silicon tetrafluoride and the like, adjacent the point of discharge of slurry onto the belt. The belt length and its speed were such that the mixture remained on the belt about 20 minutes. The discharge from the belt was stored in a pile for about 30 days.

The stored material was then removed from storage, broken up and sufficient water added to give a slurry of about 35% undissolved solids. The slurry was subjected to four stages of continuous countercurrent decantation followed by a final filtration to produce a leach solution containing about 30% dissolved solids and being of about approximately 32° Bé. gravity. This solution contained approximately 25% free phosphoric acid, approximately 75% monocalcium phosphate and dissolved mineral constituents.

This solution being low in aluminum content, when diluted to a specific gravity of approximately 1.3 was ready for solvent extraction. The solution was treated with approximately 1 lb. of powdered metallic iron per 20 gallons of solution and agitated for about 30 minutes after which the solids were filtered from the liquid. The solution reduced by the iron reaction was then intimately contacted with approximately one gallon of organic solvent per 10 gallons of reduced solution, said organic solvent being composed of nine parts by volume of kerosene and one part volume of a mixture of mono and di-esters of ortho and/or pyro phosphoric acids and iso octyl alcohol in a five stage countercurrent liquid liquid extraction system. The intimate contact was maintained for about one to two minutes in each successive stage and then allowed to separate to form an organic solvent phase and an aqueous phase. This aqueous phase was processed to recover valuable constituents which form no part of the present invention. The organic solvent phase now rich in extracted uranium was treated with about one gallon of acid mixture per three gallons of organic solvent. This acid mixture was prepared by mixing 2 volumes of 35% phosphoric acid with one volume of 50% hydrofluoric acid. After agitation, the aqueous phase separating from the organic solvent and containing the uranium precipitate was removed, and the uranium tetrafluoride precipitate filtered from the solution. About 0.21 lb. of precipitate of approximately 45% uranium content is recovered from 1000 lbs. of treated solution. The aqueous HF filtrate was recycled to the precipitation step after first introducing additional hydrofluoric acid to restore its strength to the above described HF content.

The organic phase without scrubbing was recycled to the counter-current extraction system and utilized for 20 cycles.

Example 2

A leached zone feed sized to have particles in the range of approximately 150 mesh to about 220 mesh was slurried in water and mixed with 98% sulfuric acid at approximately 1.56 lbs. of dry solids per pound of acid and autoclaved at a pressure of approximately 200 lbs. per square inch at a temperature of about 390° F. for one hour. The resulting mass was cooled and leached countercurrently with water to recover solubilized constituents and the insoluble cake discarded. Approximately 1½ lbs. of water per pound of dry leached zone feed was used in the countercurrent extraction of the solubilized values from the digested mixture.

An average filtration rate through the countercurrent leaching operation of 7 lbs. of dry solids per square foot per hour was obtained. Overall recoveries of the desirable constituents in the leached zone material were between 80% and 90%. To this extract at 60° C. was added 0.137 lb. of ammonium acid sulfate and 0.0818 lb. of ammonium sulfate per lb. of extract and cooled to about 5° C. to crystallize a material substantially as ammonium aluminum alum.

The overall recovery of $Al_2O_3$ obtained after recrystallization and washing was approximately 87%. The solution recovered after separation of the ammonium alum crystals was subjected to contact with about 1 lb. of powdered metallic iron per 20 gallons of solutions and agitated for about 30 minutes after which the solids were filtered from the liquid. This liquid was then intimately contacted on a volume ratio basis of approximately 10 gallons of solution to 1 gallon of organic solvent with an organic solvent composed of 9 parts by volume of kerosene extender and 1 part by volume of extractant mixture of mono and diesters, of ortho and/or pyrophosphoric acids of iso octyl alcohol, in a 5 stage countercurrent liquid liquid extraction system. The intimate contact was maintained for one to two minutes in each of the successive stages and the mixture then allowed to settle and separate into an aqueous phase and an organic solvent phase. The aqueous phase was then processed to recover iron phosphate and ammonium materials. The organic solvent phase now rich in extracted uranium was treated with about one gallon of acid mixture per three gallons of organic solvent. This acid mixture was prepared by mixing 2 volumes of 35% phosphoric acid with one volume of 50% hydrofluoric acid. After agitation, the aqueous phase separating from the organic solvent and containing the uranium precipitate was removed, and the uranium tetrafluoride precipitate filtered from the solution. About 0.34 lb. of precipitate or approximately 45% uranium content is recovered from 1000 lbs. of treated solution. The organic phase without scrubbing was recycled to the counter-current extraction system. The aqueous HF filtrate is recycled to the precipitation step after first introducing additional hydrofluoric acid to restore its strength to the above described HF content.

The organic phase had an initial extraction efficiency of 60% for the first stage and substantially complete extraction of uranium was obtained with 6 stages of countercurrent extraction. After passing through 20 cycles the extraction efficiency had dropped to approximately 45%.

*Example 3*

An organic solvent phase rich in uranium which had the same composition as outlined in Example 2 was contacted with an aqueous solution of 50% hydrofluoric acid in order to precipitate the uranium. This 50% acid was used as a substitute for the mixture of acid used in Example 2.

After each extraction operation the HF content was restored to 50% by introduction of gaseous hydrofluoric acid.

The volume ratio of aqueous solution to organic solvent was maintained at the 10:1 ratio held under the condition of Example 2.

Under these extraction conditions, the organic solvent had an initial extraction efficiency of about 60%. Despite restoration of the HF content between each recycle of the organic solvent, the solvent had lost its entire ability to extract uranium (zero efficiency) in 7 cycles.

Comparison of this operation life with that of the organic solvent when treated as in Example 1 or 2 with a mixture of acids shows not only that the extraction efficiency is maintained high for 5 to 6 times the organic solvent life in Example 3, i. e. whereas the solvent of Example 3 was useless after 7 cycles and substantially useless after 5 cycles, in the processes of Examples 1 and 2, the percent of uranium extracted at 20 cycles is not only still in excess of 45% but at 30 cycles the extraction is still in excess of 30% and only approaches zero in an asymptotic manner.

I claim:

1. In a process of recovering aluminum and uranium values from aqueous phosphate solutions containing the same the steps comprising reacting the solution with a sulfate of ammonia, removing the ammonium alum crystals formed, subjecting the resultant solution to a reduction reaction, contacting the reacted solution with an organic solvent having an affinity for uranium values, separating the uranium-rich organic solvent from the contacted aqueous phosphate solution, treating the rich organic solvent with an aqueous mixture of phosphoric acid and hydrofluoric acid to precipitate the uranium, separating the aqueous acid phase from the organic phase, returning the organic phase to the extraction system, and separately recovery the uranium precipitate and aqueous acid mixture.

2. The process of recovering uranium values from phosphate solution containing same which comprises subjecting the solution to a reduction action, contacting the phosphate solution with phosphoric acid ester organic solvent having affinity for uranium values, separating the aqueous phase from the uranium-rich organic solvent phase, treating the organic phase with an aqueous mixture of phosphoric acid and hydrofluoric acid to precipitate the uranium, separating the aqueous acid phase from the organic phase, returning the organic phase to the extraction system and separately recovering the uranium precipitate and the aqueous acid mixture.

3. The process of recovering uranium values from Florida phosphate rock which comprises grinding the rock to a particle size approximately 62% of which passes a 200 mesh standard screen, mixing the rock with solubilizing acid, aging the acid rock mix for about 30 days, leaching the aged acid rock mix with sufficient aqueous medium to give a slurry of about 35% undissolved solids, countercurrently removing the soluble constituents from the slurry with water to obtain a solution containing about 30% dissolved solids, treating the solution with approximately one pound of metallic iron per 20 gallons of solution, contacting the reduced solution with approximately one gallon of organic solvent per ten gallons of reduced solution, said organic solvent being composed of 9 parts by volume of kerosene and one part by volume of a mixture of mono di-esters of ortho and pyrophosphoric acids of octoyl alcohol, treating the organic solvents rich in uranium with about one gallon of acid mixture per three gallons of organic solvent, the acid mixture being a mixture of two volumes of 35% phosphoric acid with one volume of 50% hydrofluoric acid, separating the aqueous acid phase from the organic phase, returning the organic phase to the extraction system and filtering the uranium precipitate from the aqueous acid mixture.

4. The process of recovering uranium values from leached zone material which comprises preparing a sized fraction of particles in the range of approximately 150 mesh to about 200 mesh from the leached zone feed, slurrying the fraction in water, mixing with the slurry 98% sulfuric acid in the ratio of approximately 1.56 pounds of dry solids per pound of acid digesting the mixture at a pressure of approximately 200 pounds per square inch and at a temperature of about 390° F. for one hour, leaching the digested material countercurrently with water to recover solubilized constituents, adding to the extract at 60° C. approximately 0.137 pound ammonium acid sulfate and 0.0818 pounds of ammonium sulfate per pound of extract, cooling the mixture to about 5° C. to crystallize ammonium aluminum alum, treating the aluminum alum free solution with about one pound metallic iron per 20 gallons of solution, separating the metallic iron after about 30 minutes of contact time, contacting the resultant liquor on a volume ratio basis of approximately 10 gallons solution to one of organic solvent with an organic solvent composed of 9 parts by volume of kerosene extender and one part by volume of extractant mixture of mono and di-esters of ortho or pyro phosphoric acids of octyl alcohol, separating the mixture into an aqueous phase and an organic solvent phase, treating the organic solvent phase rich in uranium with about one gallon of acid mixture per gallon of organic solvent, the acid mixture being composed of approximately two volumes of 25% phosphoric acid with one volume of 50% hydrofluoric acid, separating the aqueous acid phase from the organic solvent phase, returning the stripped solvent phase to the extraction system, filtering the uranium tetrafluoride precipitate from the aqueous acid phase, adding to the aqueous acid phase sufficient HF to restore its strength to the original hydrofluoric content, and recycling the acid mixture to the precipitation stage.

5. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous solution, treating the rich organic solvent with an aqueous mixture of phosphoric acid and hydrofluoric acid to precipitate the uranium, separating the aqueous acid phase from the organic phase, returning the organic phase to the extraction system and separately recovering the uranium precipitate and the aqueous acid mixture.

6. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous solution, treating the rich organic solvent with an aqueous mixture of phosphoric acid and hydrofluoric acid to precipitate the uranium, separating the aqueous acid phase from the organic phase, returning the organic phase to the extraction system, introducing hydrofluoric acid into the aqueous acid mixture to replace the hydrofluoric acid lost during processing, and recycling the restored acid mixture to the uranium precipitation step.

7. In a process of recovering uranium values from aqueous phosphate solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous solution, treating the rich organic solvent with an aqueous mixture of phosphoric acid and hydrofluoric acid in a volume ratio range of solvent to aqueous acid solution between about 1 to 1 and about 40 to 1 to precipitate the uranium, separating the aqueous acid phase from the organic phase, returning the organic phase to the extraction system and separately recovering the uranium precipitate and the aqueous acid mixture.

8. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous phosphate solution, treating the rich organic solvent with an aqueous mixture of phosphoric acid and hydrofluoric acid in a volume ratio range of solvent to aqueous acid solution between about 2 to 1 and about 8 to 1 to precipiate the uranium, separating the aqueous acid phase from the organic phase, returning the organic phase to the extraction system and separately recovering the uranium precipitate and the aqueous acid mixture.

9. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous solution, treating the rich organic solvent with an aqueous mixture of phosphoric acid and hydrofluoric acid in the volume ratio range of solvent to aqueous acid solution between about 1 to 1 and about 40 to 1 to precipitate the uranium, the percentage of phosphoric acid present being between about 15 percent and about 45 percent by weight and the percentage of hydrofluoric acid present being between about 10 percent and about 30 percent by weight, separating the aqueous acid phase from the organic phase, returning the organic phase to the extraction system and separately recovering the uranium precipitate and the aqueous acid mixture.

10. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising separating the uranium-rich organic solvent from the contacted aqueous solution, treating the rich organic solvent with an aqueous mixture of phosphoric acid and hydrofluoric acid in the volume ratio range of solvent to aqueous acid solution between 1 to 1 and about 40 to 1 to precipitate the uranium, the percentage of phosphoric acid present being between 20 to 30 percent by weight and the percentage of hydrofluoric acid present being between about 15 to 25 percent, separating the aqueous acid phase from the organic phase, returning the organic phase to the extraction system and separately recovering the uranium precipitate and the aqueous acid mixture.

11. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising contacting the aqueous solution with organic solvent containing an extender and an alkyl acid ester extractant made from a phosphoric acid selected from the group consisting of ortho and pyrophosphoric acids reacted with alkyl monohydric alcohols and mixtures thereof, separating the uranium-rich organic solvent from the contacted aqueous phosphate solution, treating the rich organic solvent with an aqueous mixture of phosphoric acid and hydrofluoric acid to precipitate the uranium, separating the aqueous acid phase from the organic phase, returning the organic phase to the extraction system and separately recovering the uranium precipitate and the aqueous acid mixture.

12. In a process of recovering uranium values from aqueous solution containing tetravalent uranium values by liquid-liquid extraction with an organic solvent containing an alkyl acid ester of a phosphoric acid selected from the group consisting of orthophosphoric acid and pyrophosphoric acid, the steps comprising subjecting the aqueous solution to a reduction reaction, contacting the reduced aqueous solution with the organic solvent, separating the uranium-rich organic solvent from the contacted aqueous solution, treating the rich organic solvent with an aqueous mixture of phosphoric acid and hydrofluoric acid to precipitate the uranium, separating the aqueous acid phase from the organic phase, returning the organic phase to the extraction system and separately recovering the uranium precipitate and the aqueous acid mixture.

13. The process according to claim 12 in which the alkyl acid ester is an ester of iso-octyl alcohol.

14. In a process of recovering uranium values from aqueous phosphate solution containing tetravalent uranium values by liquid-liquid extraction with an organic solvent containing an alkyl acid ester of a phosphoric acid selected from the group consisting of orthophosphoric acid and pyrophosphoric acid, the steps comprising subjecting the phosphate solution to a reduction reaction, contacting the reduced phosphate solution with the organic solvent, separating the uranium-rich organic solvent from the contacted aqueous phosphate solution, treating the rich organic solvent with an aqueous mixture of phosphoric acid and hydrofluoric acid to precipitate the uranium, separating the aqueous acid phase from the organic phase, returning the organic phase to the extraction system and separately recovering the uranium precipitate and the aqueous acid mixture.

References Cited in the file of this patent

UNITED STATES PATENTS

| | | |
|---|---|---|
| 2,227,833 | Hixson et al. | Jan. 1, 1941 |
| 2,767,045 | McCollough | Oct. 16, 1956 |
| 2,769,686 | McCullough et al. | Nov. 6, 1956 |

OTHER REFERENCES

Friend: Textbook of Inorganic Chemistry, vol. 7, part 3, pp. 291–293 (1926), Charles Griffin & Co., Ltd., London.

Warf: U. S. Atomic Energy Comm., Declassified Document No. 2524, Aug. 7, 1947. Declassified Mar. 11, 1949, 10 pp.

Wright: U. S. Atomic Energy Comm., Declassified Paper No. Y–884, 20 pages, May 7, 1952.